United States Patent [19]

van der Lely

[11] 4,350,353
[45] Sep. 21, 1982

[54] TANK WAGON

[76] Inventor: Cornelis van der Lely, 7 Brüschenrain, Zug, Switzerland

[21] Appl. No.: 147,065

[22] Filed: May 6, 1980

[30] Foreign Application Priority Data

May 8, 1979 [NL] Netherlands .................... 7903572

[51] Int. Cl.³ .................................................. B60P 3/22
[52] U.S. Cl. ..................................... 280/5 C; 137/520; 137/576; 220/22
[58] Field of Search ............... 280/5 C, 5 E, 5 F, 5 R; 220/22; 137/520, 576

[56] References Cited

U.S. PATENT DOCUMENTS 2,558,168  6/1951  Bernstein .......................... 280/5 C
3,212,824  10/1965  Emery et al. ...................... 280/5 C

FOREIGN PATENT DOCUMENTS 465226  5/1950  Canada ............................. 280/5 C
133768  12/1959  U.S.S.R. ........................... 280/5 C

*Primary Examiner*—Joseph F. Peters, Jr.
*Assistant Examiner*—Donn McGiehan
*Attorney, Agent, or Firm*—William B. Mason

[57] ABSTRACT

A tank wagon includes an elongated tank for transporting liquid material on a frame supported by at least one wheel set. The center line of the tank extends in an inclined direction in a forward direction. The lowermost point of the tank is in front of the wheel set with respect to the normal direction of wagon travel. The tank is composed by at least two substantially cylindrical compartments of different diameters. The compartment having the smaller diameter is rearmost and located directly above the wheel set. The two tank compartments have center lines that extend at different levels and parallel to one another. The wagon is stable in operation and its construction is such that emptying the wagon of its contents is facilitated through a tube that interconnects the lowermost points of the compartments. Preferably, the smaller diameter compartment is joined to the front compartment so that the center line of the former is substantially above that of the latter.

19 Claims, 4 Drawing Figures

TANK WAGON

This invention relates to tank wagons for transporting liquid material. Hereinafter where reference is made to "front", "rear" and so on, this is with respect to the intended direction of forward movement of the wagon over the ground.

The transport of relatively large quantities of liquid by tank wagon involves the disadvantage that the center of gravity of the overall bulk of the tank wagon and the material transported tends to be located too high above the road with regard to hazards in the case of comparatively high speed. Particularly in carrying out breaking manoevres at bends, the tank wagon is very likely to break away from a tractor hauling it. In such transport, quantities of 20,000 to 25,000 liters and more can be involved so that particularly in the event of transporting liquids of high specific weight (which may even be more than 5) very large masses are accelerated and decelerated.

The term "liquid" used herein for tank wagon transport has to be understood to include also very thick-liquids fluids (such as barytes). The liquids may be mixtures of light- and heavy-weight components and dissociation of the mixture may readily occur. In such cases difficulties arise in filling and also in emptying the tank wagons, since the thick-liquid fluid flows away, as the case may be in a dissociated state, in an unacceptable manner, while heavier portions are retained in the tank wagon in an undesirable manner.

According to the present invention there is provided a tank wagon comprising a tank for transporting liquid material supported by at least one wheel set, the bottom of the tank being disposed in an inclined position and the lowermost point of the tank being located in front of the wheel set. As will be made clear hereinafter, such a wagon has stability in operation, and emptying the wagon of its contents is facilitated.

For a better understanding of the invention and to show how the same way be carried into effect, reference will now be made, by way of example, to the accompanying drawings in which.

Figure 1:
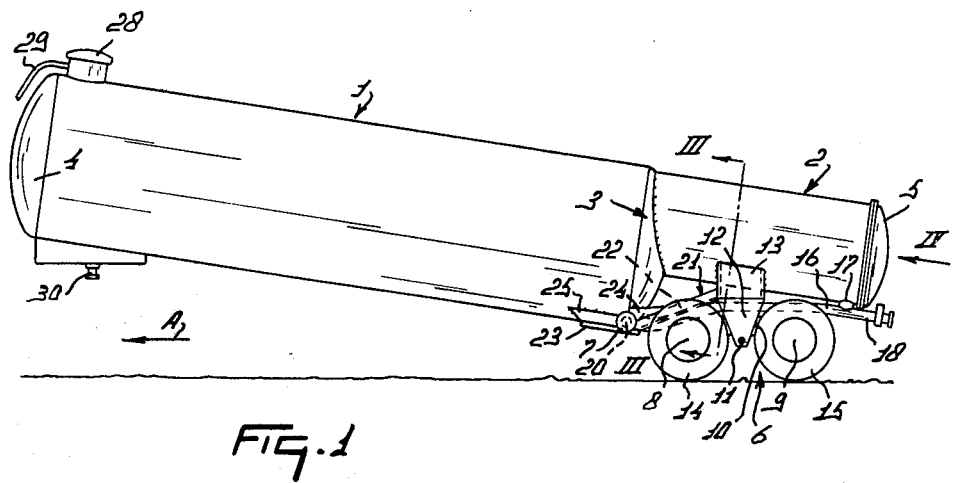
FIG. 1 is a side view of a tank wagon.
Figure 2:
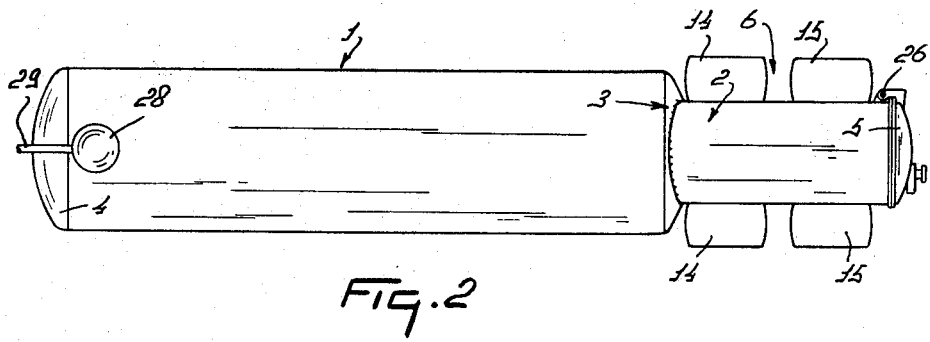
FIG. 2 is a plan view of the tank wagon of FIG. 1.

The tank wagon illustrated in the Figures is intended for road transport and in the embodiment illustrated as a semi-trailer. It could, however, be a trailer truck or a self-propelled vehicle. The useful space inside the wagon for the transport of material is mainly bounded by the walls of two tank compartments formed by hollow sheet steel cylinders 1 and 2, which are interconnected by means of a transitional part 3, in a liquid-tight manner, such that the spaces inside the cylinders 1 and 2 communicate with one another.

The cylinder 1 which is the front cylinder with respect to the intended direction of forward travel A has in the particular form illustrated a length of about 7.2 ms and a diameter of about 1.94 ms, whereas the cylinder 2 which is smaller and is located behind the cylinder 1 has a length of about 2.6 ms and a diameter of about 1.22 ms, these dimensions being given by way of example only. The overall capacity of the wagon consists of the capacities of the cylinders 1 and 2, the contents of the transitional part 3 located between the cylinders 1 and 2 (this proportion of the total being comparatively small) and the contents of the spaces bounded by a cover 4 at the front end of the cylinder 1 and by a cover 5 at the rear end of the cylinder 2, both these covers 4 and 5 being hemi-spherical.

The center lines of the cylinders 1 and 2 are parallel to one another and are both at an angle of about 8° to a horizontal plane. The front end of the rear cylinder 2 is fastened by means of the transitional part 3 to the rear end of the front cylinder 1 in a manner such that the upper generatrices of the cylinders 1 and 2 are substantially in line with one another, while the vertical plane passing through the upper generatrix of the cylinder 1 and the center line of the cylinder 1 coincides with the vertical pulse passing through the upper generatrix of the cylinder 2 and the center line of the cylinder 2. The front ends of the cylinders 1 and 2 are located at a higher level than the respective rear ends.

The transitional part 3 is composed of a steel sheet having the shape of part of a sphere (similar to the covers 4 and 5), which is bounded by the line of intersection of this port-spherical part and the cylinder 2. The length of the transitional part 3 measured in a direction parallel to the centre line of the cylinder 1 or 2 near the upper generatrix of the cylinders 1 and 2 is comparatively small and amounts to about 2% of the length of the cylinder 2.

Since the upper generatrices of the cylinders 1 and 2 are substantially in line with one another and the diameter of the cylinder 1 is markedly larger than that of the cylinder 2, a space is formed behind the transitional part 3 and beneath the cylinder 2, in which a wheel set 6, in this case a semi-trailer wheel set, is disposed at least in part. Therefore, the lowermost point of the entire space within the wagon (also the lowermost point of the cylinder 1, designated by reference numeral 7) is located in front of the wheel set 6 and approximately at the level of the horizontal plane passing through the axles 8 and 9 of the wheel set. With respect to the direction of travel A the wheel axles 9 and 8 are located one behind and parallel to the other and are supported by a wheel frame 10, which is fastened to supports 12 located one on each side of the cylinder 2 so as to be freely pivotable about a horizontal pivot shaft 11 extending transversely of the direction of travel A, these supports 12 being rigidly secured to the cylinder 2 by means of upwardly extending steel sheets 13, which directly support the cylinder 2 and are directed vertically or tangentially to the cylinder 2. The pivot shaft 11 is located substantially midway between the wheel axles 8 and 9.

Figure 4:
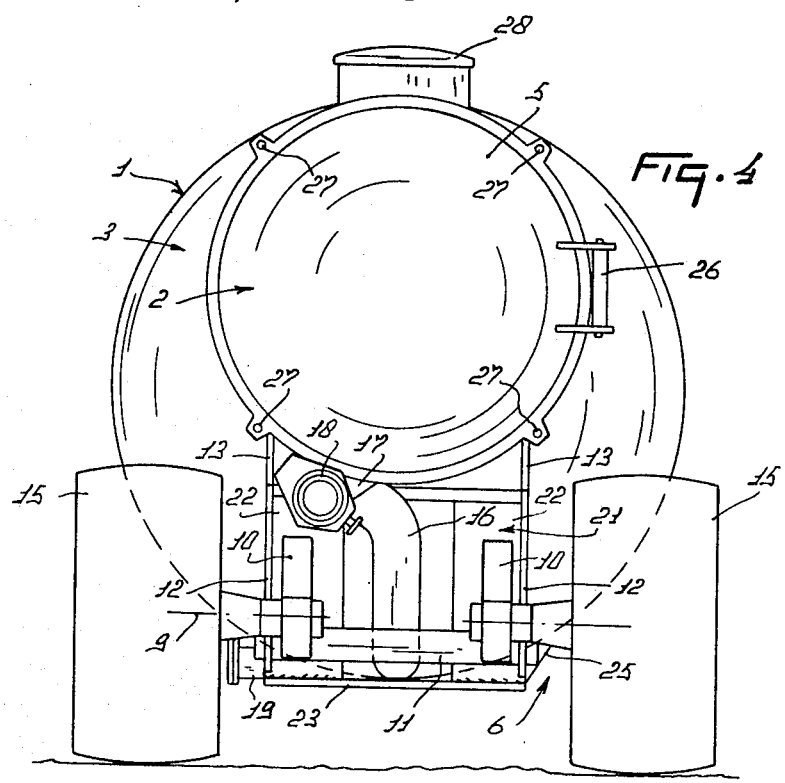
FIG. 4 is an end view in the direction of arrow IV in FIG. 1.

On each side of the vehicle each wheel axle 8 and 9 respectively is provided with tyred ground wheels 14 and 15 respectively. Between the top of the wheel set 10 and the bottom of the cylinder 2 and also between the inner sides of the sets of wheels 14 and 15 respectively there is a space in which a tube 16 is disposed. The tube 16 communicates at the front, or can be connected there, with the interior of the cylinder 1 at the zone designated by reference numeral 7, whereas near its rear end (reference numeral 18) the tube 16 communicates with, or can be connected to the interior of the cylinder 2, the connection at 17 being downwardly and laterally inclined and located at the lowermost point of the cylinder 2, hence near the bottom rear end thereof. Viewed in plan, the tube 16 may be located near the center lines of the cylinders 1 and 2, but the rear end 18 of the tube 16 is bent over towards one side of the wagon (FIG. 4).

Figure 3:
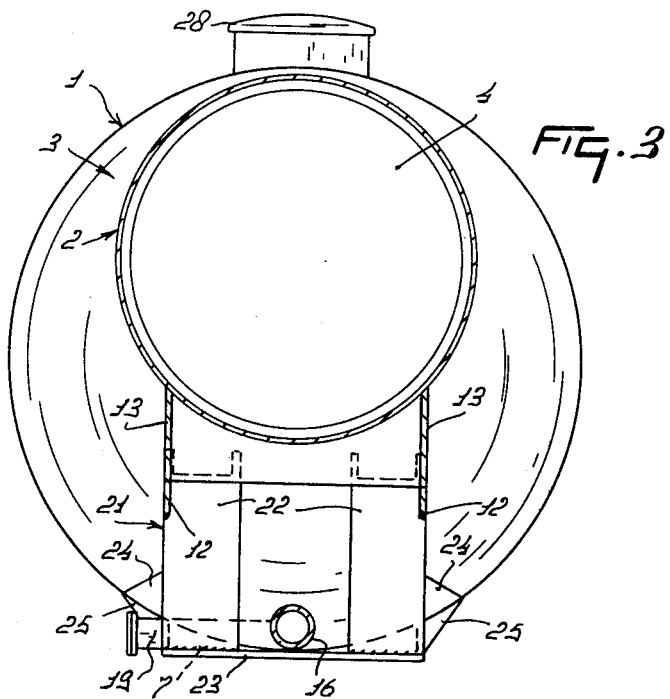
FIG. 3 is partly a sectional view and partly a side view taken on the line III—III in FIG. 1.

Near its front the tube 16 communicates with a lateral tube 19 directed at right angles to the direction of travel A (FIG. 3), which has an opening 20 extending substantially at right angles to the direction of travel A. Viewed from the side, the lateral tube 19 and its opening 20 are located at the lowermost point 7 of the cylinder 1. The tube 16 serves as an intake tube for liquids to be introduced into the cylinders 1 and 2, and as an evacuation tube for liquids to be conducted away from the cylinders 1 and 2.

Between the rear end and the bottom of the cylinder 1 (near reference numeral 7) and the supporting plates 13 disposed near the bottom of the cylinder 2 there is a stiffening part 21, which is inclined from its connection with the bottom of the cylinder 1 upwardly and rearwardly as viewed from its side. The stiffening part 21 is composed of two relatively spaced and parallel U-profiles 22 located one on each side of the vertical plane of symmetry of the tank wagon, the webs of these profiles being at right angles to the vertical plane of symmetry of the wagon. Part of the tube 16 is located between the two profiles 22. Near their fronts and bottoms the profiles 22 bear on the side tube 19 also serving as a stiffening part and, in addition, on a flat plate 23. On their fronts and tops they terminate in supporting plates 24, which transfer forces from the flanges of the profiles 22 to the cylinder sidewall of the cylinder 1. The supporting plates 24 constitute, therefore, a rigid, progressive transition element between the outer flanges of the U-profiles 22 and the rear end and bottom of the cylinder 1. Viewed from the side, the plate 23 extends at right angles to the vertical plane of symmetry of the tank wagon and extends from its rear end located near the webs of the profiles 22 to the front beneath the bottom of the cylinder 1 and is in contact with the cylinder 1 along the lowermost generatrix of the cylinder 1. On both sides the plate 23 is connected by means of a supporting plate 25 with the wall of the cylinder 1, the supporting plates 25 extending tangentially to the cylinder 1. Therefore, viewed from the side, the supporting plate 23 is, like the cylinder 1, at an angle of about 8° in an upwardly forwardly inclined position. In this direction the length of the plate 23 may be 0.5 to 2 ms, preferably about 70 cms, dependent upon circumstances.

The stiffening part 22 ensures that bending moments at the area of the transition between the cylinders 1 and 2 near their bottoms are transferred so that the bottom of the cylinder 2 is prevented from loading the transitional part 3 at right angles to its surface. On the top of the two cylinders the load resulting from the bending moment can pass from one cylinder to the other in a practically undisturbed manner.

The cylinders 1 and 2 are accessible near the rear of the wagon, since the cover 5 on the rear of the cylinder 2 is pivotable about a substantially vertical pivot shaft 26, so that it can be opened, for example, for cleaning operations, and can be fixed in the closed state by fixing devices 27 (FIG. 4).

At the front on the top the tank wagon is provided with a connecting part 28 through which the cylinders 1 and 2 can be exhausted or subjected to excess pressure. For this purpose the connecting part 28 is provided with an intake-compression tube 29, which can be connected with an exhaust or compression system (not shown) which may be provided on the tank wagon itself or on a tractor hauling the wagon, or which may be a stationary system. On the bottom and front of the cylinder 1 a pin 30 is provided for coupling the tank wagon with the fifth wheel of a tractor.

Difficulties in transporting large quantities of liquids have been described above. With regard to such problems, the tank wagon herein described has two cylindrical tank compartments of which the compartment of the larger diameter and length is located in front of the wheel set and bears at the front on the tractor hauling the wagon. The other tank compartment is disposed above the wheel set and directly bears thereon. Since the upper generatrices of the two tank compartments are substantially in line with one another and the diameter of the front tank compartment exceeds that of the rear tank compartment, the rear and bottom of the front tank compartment are located in front of the wheel set in a manner such that the lowermost point of this tank compartment is substantially located in the horizontal plane passing through the wheel axles of the wheel set. It is thus achieved that a comparatively large part of the bulk of the tank wagon and of the material to be transported is located at a comparatively low level, particularly in a space which is generally not utilised as a load carrying space in known constructions. Moreover, the center lines of the two tank compartments are inclined forwards and upwards at an angle of about 8°. During transport the comparatively heavy parts of the fluid being transported seek the bottoms of the two tank compartments and collect in the lower rear space of each, owing to their inclined positions, so that these heavy parts accumulate near the outlet ports in the area of communication between the front tank compartment and the tube 16 and the side tube 19, and between the connection 17 to the tube 16 from the rear tank compartment. Owing to its inclined position, the contents of the front tank compartment can directly flow away under pressure via the opening 20 near the lowermost point 7 and the dissociated mass near the bottom and rear of the rear tank compartment can flow away through the connection 17 and the rear end 18 and also through the tube 16 to the front towards the side tube 19 and the outlet port 20. In this way the dissociation of the fluid is utilised since the heavier parts are first conducted away and the tank compartment concerned is flushed by the lighter parts, to which contribute the positions of the two tank compartments and the relative dispositions and shapes of the two tank compartments as described above.

With the dimensions given above, the height of the centre of gravity in the loaded state above the ground may be less than 2 meters.

The comparatively great length of the front tank compartment is advantageous in travelling on roads including less strong bridges with regard to the comparatively large mass of the loaded tank wagon. Bridges of a length up to about 7 ms at a maximum are only loaded by the pressure of the wheel set 6.

If the moving tank wagon should sink in weaker ground, the rear and bottom of the front tank compartment remain bearing on the ground by the plate 23. The plate 23 distributes the pressure between the front tank compartment and the ground over a comparatively large surface, and damage and breakage of this tank compartment are avoided, which may be very important in the event of hazardous substances in the tank.

While various features of the tank wagons that have been described, and that are illustrated in the drawings, will be set forth in the following claims as inventive features, it is to be noted that the invention is not necessarily limited to these features and that it encompasses all of the features that have been described both individually and in various embodiments.

I claim:

1. A tank wagon comprising a frame and a tank for transporting liquid material, said frame being supported by a rear wheel set, said tank having a longitudinal axis that extends in the direction of wagon travel and said axis being inclined upwardly in a forward direction, with reference to the normal direction of travel, a lowermost tank point being located in front of said wheel set and below the top of the wheels, tank outlet means being located adjacent said lowermost point, said tank comprising two substantially cylindrical tank compartments of different diameters that enclose an uninterrupted space, the smaller diameter compartment being located directly above said wheel set.

2. A tank wagon as claimed in claim 1, wherein said lowermost point is located about at the level of an axle of said wheel set.

3. A tank wagon as claimed in claim 1, wherein said compartments are elongated and their center lines are positioned at different levels from one another.

4. A tank wagon as claimed in claim 3, wherein said compartments are positioned one behind the other.

5. A tank wagon as claimed in claim 3, wherein said center lines extend substantially parallel to one another in a single vertical plane.

6. A tank wagon as claimed in claim 5, wherein the upper generatrices of said compartments are substantially in line with one another.

7. A tank wagon as claimed in claim 1, wherein each compartment has an inlet-outlet port for liquids that communicates with said lowermost point.

8. A tank wagon as claimed in claim 7, wherein said compartments communicate with one another through a tube.

9. A tank wagon comprising a frame and a tank for transporting liquid material, said tank comprising two substantially cylindrical compartments of different diameters, said compartments defining an uninterrupted interior space, the center lines of said compartments extending at different levels and generally one behind the other, the lowermost points of said compartments being in communication with one another via a tube.

10. A tank wagon as claimed in claim 9, wherein said tube interconnects the lowermost points of said compartments, and one of said points is located above the other.

11. A tank wagon as claimed in claim 10, wherein a further, laterally extending tube communicates with the first mentioned tube at a connection adjacent to the lowermost point of the front compartment.

12. A tank wagon as claimed in claim 11, wherein the first-mentioned tube has a rear, laterally directed opening.

13. A tank wagon as claimed in claim 9, wherein a supporting plate on the compartment of larger diameter is located below the lowermost point of the tank and adjacent that point, a rear wheel set supporting the frame, said set being positioned to the rear of said plate and beneath the compartment of smaller diameter, said plate being interconnected with said wheelset by stiffening means.

14. A tank wagon as claimed in claim 13, wherein said plate is inclined upwards and forwardly with reference to the direction of travel.

15. A tank wagon as claimed in claim 14, wherein said plate is substantially flat and extends at right angles to the vertical plane of symmetry of the wagon.

16. A tank wagon as claimed in claim 9, wherein the majority of said tube extends beneath the tank compartment of smaller diameter and in a downward direction towards the lowermost point of the tank.

17. A tank wagon as claimed in claim 9, wherein the center lines of said compartments extend at an angle to a horizontal plane.

18. A tank wagon as claimed in claim 17, wherein said center lines of the compartments at an angle of about 8° to the horizontal.

19. A tank wagon as claimed in claim 17, wherein the front end of each compartment is located at a higher level than the corresponding rear end and the lowermost point of said compartment of smaller diameter is above the lowermost point of the other compartment.

* * * * *